(12) United States Patent
Sugeta (10) Patent No.: US 11,447,352 B2
(45) Date of Patent: Sep. 20, 2022

(54) SENSOR CONTROL APPARATUS, SENSOR SYSTEM, AND IMAGE FORMING APPARATUS

(71) Applicant: CANON KABUSHIKI KAISHA, Tokyo (JP)

(72) Inventor: Mitsuhiro Sugeta, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 357 days.

(21) Appl. No.: 16/823,593

(22) Filed: Mar. 19, 2020

(65) Prior Publication Data

US 2020/0216280 A1 Jul. 9, 2020

Related U.S. Application Data

(63) Continuation of application No. PCT/JP2018/046861, filed on Dec. 19, 2018.

(30) Foreign Application Priority Data

Dec. 22, 2017 (JP) .............................. JP2017-246942

(51) Int. Cl.
*B65H 7/20* (2006.01)
*B65H 5/06* (2006.01)
(Continued)

(52) U.S. Cl.
CPC .............. *B65H 7/20* (2013.01); *B65H 5/062* (2013.01); *B65H 7/02* (2013.01); *G01D 5/24457* (2013.01);
(Continued)

(58) Field of Classification Search
CPC . B65H 5/062; B65H 7/02; B65H 7/06; B65H 7/08; B65H 7/10; B65H 7/14;
(Continued)

(56) References Cited

U.S. PATENT DOCUMENTS 4,338,671 A * 7/1982 Korytkowski ........... B65H 7/02
702/182
5,140,622 A 8/1992 Shino et al.
(Continued)

FOREIGN PATENT DOCUMENTS

JP H03-201700 A 9/1991
JP H11-242538 A 9/1999
(Continued)

OTHER PUBLICATIONS

Jul. 27, 2021 Office Action in Japanese Patent Application No. 2017-246942.
(Continued)

*Primary Examiner* — Steven L Yeninas
(74) *Attorney, Agent, or Firm* — Venable LLP (57) ABSTRACT

Provided is a sensor control apparatus including a main board, a first sensor, a second sensor, and a third sensor, which are connected in series to the main board. The first sensor includes a diagnosis unit configured to perform a failure diagnosis of each of an LED, a phototransistor, and an LED controller. In a case where a failure is detected, the diagnosis unit electrically isolates the first sensor from the
(Continued)

series connection, and supplies a power supply voltage to the second sensor.

10 Claims, 7 Drawing Sheets

(51) Int. Cl.
 *B65H 7/02* (2006.01)
 *G01D 21/00* (2006.01)
 *G01D 5/244* (2006.01)
(52) U.S. Cl.
 CPC ... *G01D 21/00* (2013.01); *G05B 2219/24033* (2013.01)
(58) Field of Classification Search
 CPC ...... B65H 7/20; B65H 2511/52; B65H 43/08; B41J 29/387; B41J 29/393; G01D 5/24457; G01D 21/00; G05B 2219/24033
 See application file for complete search history.

(56) References Cited

U.S. PATENT DOCUMENTS

| | | | |
|---|---|---|---|
| 6,946,640 B1 | 9/2005 | Kawamura | |
| 7,930,042 B2 * | 4/2011 | El-Sayed | G05B 9/03 370/227 |
| 2020/0207570 A1 | 7/2020 | Arima et al. | |

FOREIGN PATENT DOCUMENTS

| | | | |
|---|---|---|---|
| JP | 2000-307789 A | 11/2000 | |
| JP | 2008-059161 A | 3/2008 | |
| JP | 2008059161 A * | 3/2008 | G06F 3/00 |
| JP | 2015-218057 A | 12/2015 | |
| WO | 2019/124460 A1 | 6/2019 | |

OTHER PUBLICATIONS

International Search Report and Written Opinion for International Patent Application No. PCT/JP2018/046861.

* cited by examiner

SENSOR CONTROL APPARATUS, SENSOR SYSTEM, AND IMAGE FORMING APPARATUS

CROSS-REFERENCE TO RELATED APPLICATIONS

This application is a Continuation of International Patent Application No. PCT/JP 2018/046861, filed Dec. 19, 2018, which claims the benefit of Japanese Patent Application No. 2017-246942, filed Dec. 22, 2017, both of which are hereby incorporated by reference herein in their entirety.

FIELD OF THE INVENTION

The present disclosure relates to an image forming apparatus such as a copying machine or a printer, and more particularly, to a technology for controlling a sensor provided in an image forming apparatus.

BACKGROUND ART

In an image forming apparatus and an auto document feeder (ADF), a large number of sensors are arranged in order to control internal devices. For example, the image forming apparatus is mounted with a large number of sensors including a sensor to be used for detecting presence or absence of a sheet, a sensor to be used for detecting a conveying position of the sheet, and a sensor for detecting opening or closing of an exterior cover of the apparatus. The image forming apparatus or other such apparatus controls the internal devices based on detection results of the sensors, to thereby perform, for example, sheet conveyance control. To that end, a large number of sensors arranged at various positions in the apparatus and a control board configured to acquire the detection results of the sensors and perform control are connected to one another through a cable. As the number of sensors increases, the number of cables to be used inside the apparatus also increases. As the number of cables increases, the wiring space and the number of connectors on the control board increase. The increases in numbers of cables and connectors hinder downsizing of the entire apparatus, and cause an increase in cost.

Therefore, there is proposed a technology for reducing the numbers of cables and connectors by connecting a plurality of sensors in series (see Patent Literature 1). The sensors each include a resistor having a different resistance value. For example, the detection result obtained when the sheet is detected by one of the sensors is represented by a voltage value different from that of any other one of the sensors. Therefore, it is possible to discriminate which sensor the detection result has been obtained from.

CITATION LIST

Patent Literature

PTL 1 Japanese Patent Laid-Open No. 2008-59161

In a case where a plurality of sensors are connected in series, a failure in one sensor exerts an influence on another sensor. For example, when one sensor fails in a short-circuit mode, all the sensors or sensors arranged on the downstream side of the failed sensor stop operating. The present disclosure has been made in view of the above-mentioned problem, and has an object to provide a sensor control apparatus configured to suppress an influence to be exerted on another sensor even when a failure occurs in one sensor in a configuration in which a plurality of sensors are connected in series.

SUMMARY OF THE INVENTION

A sensor control apparatus according to at least one embodiment of the present disclosure includes a controller, and a plurality of sensors connected in series to the controller. The plurality of sensors each includes: a detector configured to perform a detection operation based on a first voltage applied from the controller; a first switch provided on a first path for applying a voltage, which extends from the controller to the detector; a second switch provided on a second path for supplying the voltage applied from the controller to one of the plurality of sensors in a subsequent stage; a third switch provided on a third path for outputting a detection result obtained by the detector, which extends to the controller; and a diagnosis unit configured to perform a failure diagnosis of the detector. The diagnosis unit is configured to bring, in a case where it is diagnosed that a failure has occurred in the detector, the third switch into a cutoff state to thereby electrically isolate the sensor from the series connection.

Further features of the present invention will become apparent from the following description of exemplary embodiments with reference to the attached drawings.

DESCRIPTION OF THE EMBODIMENTS

Now, at least one embodiment of the present disclosure is described in detail with reference to the accompanying drawings.

Configuration

Figure 1:
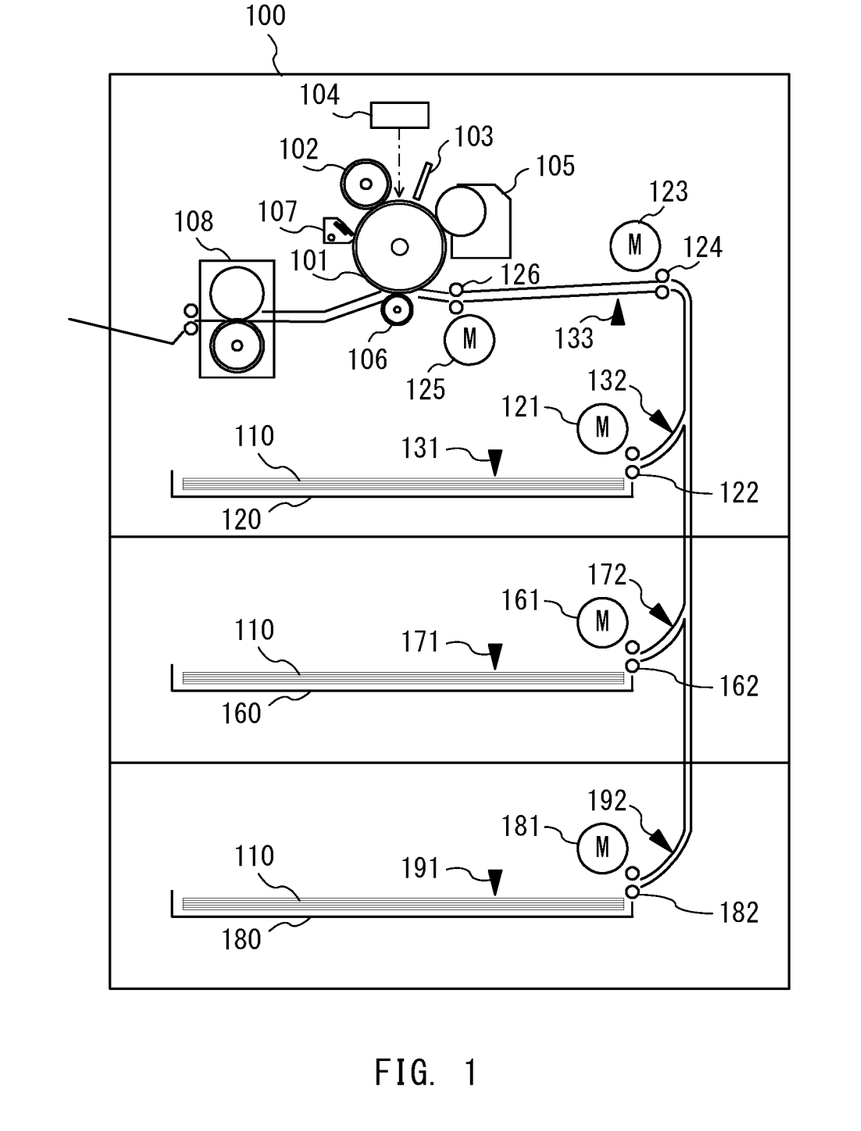
FIG. 1 is a configuration diagram of an image forming apparatus according to at least one embodiment of the present disclosure.

FIG. 1 is a configuration diagram of an image forming apparatus including a sensor control apparatus according to at least one embodiment of the present disclosure. An image forming apparatus 100 employs an electrophotographic method. The image forming apparatus 100 includes a photosensitive member 101, a charging device 102, a potential sensor 103, an exposure device 104, a developing device 105, a transfer unit 106, a cleaner 107, and a fixing device 108, which are used for image formation. The image forming apparatus 100 includes (in at least one embodiment, three) sheet feeding cassettes 120, 160, and 180, each of which is configured to receive a sheet 110. The sheet 110 on which an image is to be formed is fed from any one of those three sheet feeding cassettes 120, 160, and 180. The image forming apparatus 100 has its operation controlled by a controller (not shown).

The charging device 102 uniformly charges a surface of the photosensitive member 101. The photosensitive member 101 having the surface uniformly charged is exposed by the exposure device 104 in accordance with an image signal, to thereby form thereon an electrostatic latent image corresponding to the image signal. The developing device 105 develops the electrostatic latent image to form a toner image on the surface of the photosensitive member 101. In order to measure a potential of the electrostatic latent image, the potential sensor 103 is provided between an exposure position by the exposure device 104 and a developing position by the developing device 105. The toner image formed on the surface of the photosensitive member 101 is transferred onto the sheet 110, which is fed by any one of the sheet feeding cassettes 120, 160, and 180, by the transfer unit 106. It is specified which one of the sheet feeding cassettes 120, 160, and 180 the sheet 110 is to be fed from in a case where a print job is input. Transfer residual toner remaining on the photosensitive member 101 after the transfer is collected by the cleaner 107. The sheet 110 onto which the toner image has been transferred has the toner image fixed by the fixing device 108. The sheet 110 subjected to the image fixation is delivered from the fixing device 108 to the outside of the image forming apparatus 100. With the above-mentioned operation, a product on which an image is printed is obtained.

The sheet 110 received in the sheet feeding cassette 120 is fed to a conveyance path by sheet feeding rollers 122. The sheet feeding rollers 122 are driven by a stepping motor 121. The sheet feeding cassette 120 includes a sensor 131 configured to detect presence or absence of the sheet 110. A sensor 132 is provided on a conveyance path on the downstream side of the sheet feeding rollers 122 in the conveyance direction of the sheet. The sensor 132 detects the sheet 110 that has been conveyed by the sheet feeding rollers 122.

The sheet 110 received in the sheet feeding cassette 160 is fed to a conveyance path by sheet feeding rollers 162. The sheet feeding rollers 162 are driven by a stepping motor 161. The sheet feeding cassette 160 includes a sensor 171 configured to detect the presence or absence of the sheet 110. A sensor 172 is provided on a conveyance path on the downstream side of the sheet feeding rollers 162 in the conveyance direction of the sheet. The sensor 172 detects the sheet 110 that has been conveyed by the sheet feeding rollers 162.

The sheet 110 received in the sheet feeding cassette 180 is fed to a conveyance path by sheet feeding rollers 182. The sheet feeding rollers 182 are driven by a stepping motor 181. The sheet feeding cassette 180 includes a sensor 191 configured to detect the presence or absence of the sheet 110. A sensor 192 is provided on a conveyance path on the downstream side of the sheet feeding rollers 182 in the conveyance direction of the sheet. The sensor 192 detects the sheet 110 that has been conveyed by the sheet feeding rollers 182.

On the conveyance path, conveyance rollers 124 and conveyance rollers 126 are provided. The sheet 110 fed from each of the sheet feeding cassettes 120, 160, and 180 is conveyed to the transfer unit 106 along the conveyance path by the conveyance rollers 124 and the conveyance rollers 126. The conveyance rollers 124 are driven by a stepping motor 123. The conveyance rollers 126 are driven by a stepping motor 125. A sensor 133 configured to detect the sheet 110 being conveyed is provided between the conveyance rollers 124 and the conveyance rollers 126.

Now, a sheet feeding operation of the sheet 110 is described. When starting the sheet feeding operation, the controller detects the presence or absence of a sheet in the sheet feeding cassette having the sheet 110 received therein, which is specified by the print job.

The sheet feeding of the sheet 110 from the sheet feeding cassette 120 is performed in the following manner.

The controller detects the presence or absence of the sheet 110 in the sheet feeding cassette 120 by the sensor 131. In a case where the sheet 110 is present in the sheet feeding cassette 120, the controller starts to feed the sheet 110 received in the sheet feeding cassette 120 by the sheet feeding rollers 122. The controller causes the stepping motor 121 to drive the sheet feeding rollers 122. The sheet feeding rollers 122 convey the sheets 110 one by one from the sheet feeding cassette 120 to the conveyance rollers 124. The sensor 132 detects whether or not the sheet 110 has passed through a detection position defined on the conveyance path extending from the sheet feeding rollers 122 to the conveyance rollers 124. The controller detects whether or not the sheet 110 has passed through the detection position before a predetermined timing based on a detection result of the sensor 132.

The sheet feeding of the sheet 110 from the sheet feeding cassette 160 is performed in the following manner.

The controller detects the presence or absence of the sheet 110 in the sheet feeding cassette 160 by the sensor 171. In a case where the sheet 110 is present in the sheet feeding cassette 160, the controller starts to feed the sheet 110 received in the sheet feeding cassette 160 by the sheet feeding rollers 162. The controller causes the stepping motor 161 to drive the sheet feeding rollers 162. The sheet feeding rollers 162 convey the sheets 110 one by one from the sheet feeding cassette 160 to the conveyance rollers 124. The sensor 172 detects whether or not the sheet 110 has passed through a detection position defined on the conveyance path extending from the sheet feeding rollers 162 to the conveyance rollers 124. The controller detects whether or not the sheet 110 has passed through the detection position before a predetermined timing based on a detection result of the sensor 172.

The sheet feeding of the sheet 110 from the sheet feeding cassette 180 is performed in the following manner.

The controller detects the presence or absence of the sheet 110 in the sheet feeding cassette 180 by the sensor 191. In a case where the sheet 110 is present in the sheet feeding cassette 180, the controller starts to feed the sheet 110 received in the sheet feeding cassette 180 by the sheet feeding rollers 182. The controller causes the stepping motor 181 to drive the sheet feeding rollers 182. The sheet feeding rollers 182 convey the sheets 110 one by one from the sheet feeding cassette 180 to the conveyance rollers 124. The sensor 192 detects whether or not the sheet 110 has passed through a detection position defined on the conveyance path extending from the sheet feeding rollers 182 to the conveyance rollers 124. The controller detects whether or not the sheet 110 has passed through the detection position before a predetermined timing based on a detection result of the sensor 192.

The conveyance rollers 124 are rotated by the stepping motor 123. When any one of the sensors 132, 172, and 192 detects the sheet 110, the controller causes the stepping motor 123 to drive the conveyance rollers 124. The conveyance rollers 124 are thus rotated, to thereby convey the sheet 110, which has been fed from any one of the sheet feeding cassettes 120, 160, and 180, to the conveyance rollers 126. The sensor 133 detects whether or not the sheet 110 has passed through a detection position defined on the conveyance path extending from the conveyance rollers 124 to the conveyance rollers 126. The controller detects whether or not the sheet 110 has passed through the detection position before a predetermined timing based on a detection result of the sensor 133.

The conveyance rollers 126 are rotated by the stepping motor 125. When the sensor 133 detects the sheet 110, the controller causes the stepping motor 125 to drive the conveyance rollers 126. The conveyance rollers 126 are thus rotated, to thereby convey the sheet 110, which has been conveyed from the conveyance rollers 124, to the transfer unit 106. A timing at which the conveyance rollers 126 convey the sheet 110 to the transfer unit 106 is adjusted in accordance with a timing at which the toner image formed on the photosensitive member 101 is conveyed to the transfer unit 106. With this adjustment, the toner image is transferred onto the sheet 110 while the sheet 110 and the toner image formed on the photosensitive member 101 pass through the transfer unit 106 in an overlapping state. The controller may also control the conveyance speed of the sheet 110 conveyed by the conveyance rollers 126 so that the toner image on the photosensitive member 101 passes through the transfer unit 106 while overlapping with the sheet 110.

The sensors 131, 132, 133, 171, 172, 191, and 192 in at least one embodiment are each formed of, for example, a photo interrupter. In this case, the sensors 131, 132, 133, 171, 172, 191, and 192 each include a light emitter (for example, a light emitting diode (LED)) and a light receiver (for example, phototransistor) configured to receive light emitted from the light emitter. The sheet 110 pushes a shielding object provided at the detection position on the conveyance path to block an optical path formed between the light emitter and the light receiver, to thereby allow the sensors 131, 132, 133, 171, 172, 191, and 192 to detect the sheet 110. However, a configuration of each of the sensors 131, 132, 133, 171, 172, 191, and 192 is not limited thereto as long as the configuration allows the sheet 110 being conveyed along the conveyance path to be detected at the detection position. For example, in the configuration, the light emitter and the light receiver may be arranged so as to be opposed to each other across the conveyance path, and the optical path may be blocked when the sheet 110 passes through the conveyance path. In another case, in the configuration, an optical path to the light receiver may be formed by causing light emitted from the light emitter to be reflected by the sheet 110 on the conveyance path.

Figure 2:
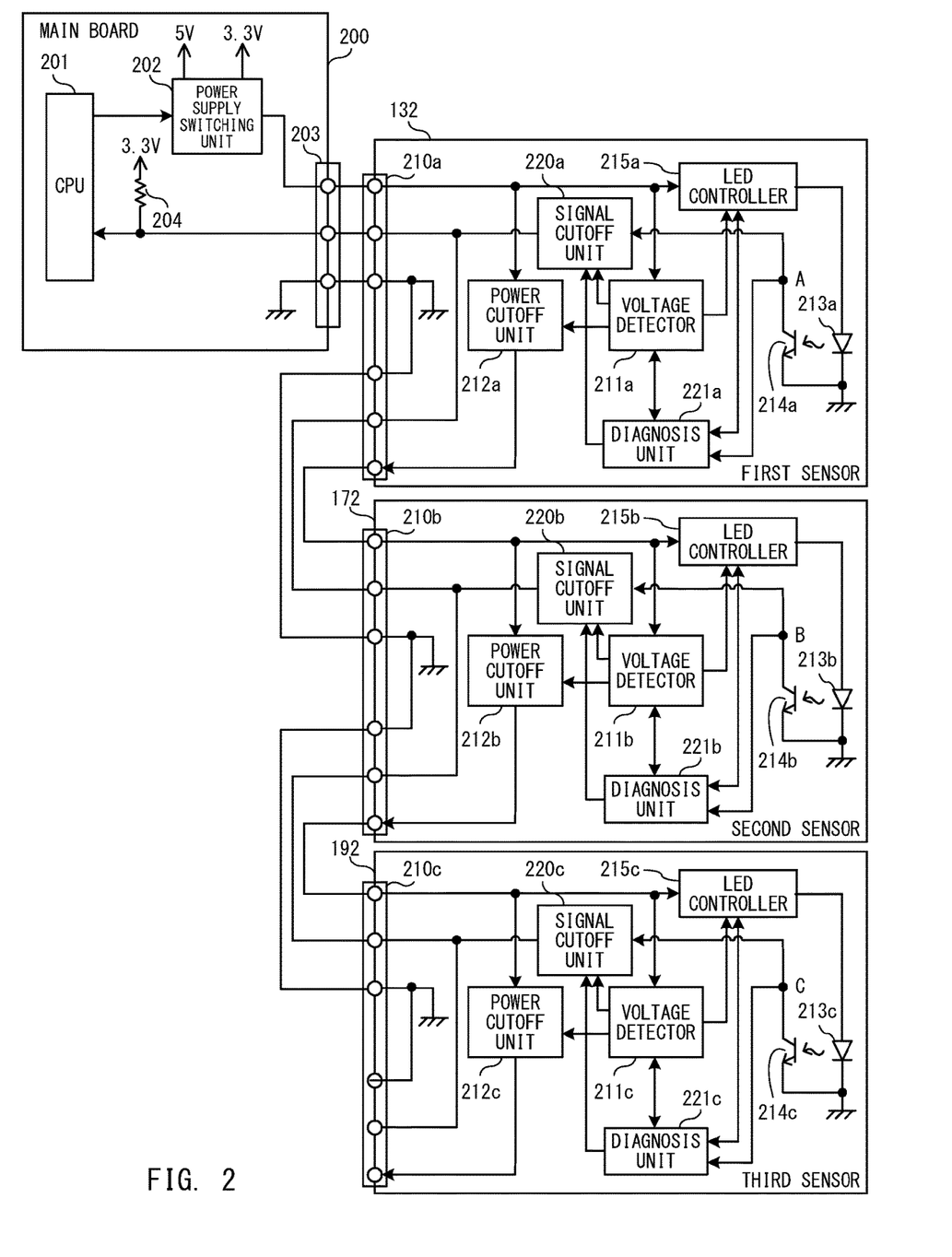
FIG. 2 is a configuration diagram of a main board and sensors.

FIG. 2 is a configuration diagram of a main board, which is included in the controller, and sensors. In the following description, the sensor 132 is referred to as "first sensor 132". The sensor 172 is referred to as "second sensor 172". The sensor 192 is referred to as "third sensor 192". Each of the first sensor 132, the second sensor 172, and the third sensor 192 includes an LED as a light emitter, and employs a phototransistor as a light receiver. A main board 200 is a sensor control apparatus configured to control operations of the first sensor 132, the second sensor 172, and the third sensor 192, and acquire their detection results.

The first sensor 132, the second sensor 172, and the third sensor 192 are connected in series to the main board 200. Assuming that the main board 200 is on an upstream side, the first sensor 132, the second sensor 172, and the third sensor 192 are connected to the main board 200 in the stated order from the upstream side. The first sensor 132, the second sensor 172, and the third sensor 192 have the same internal configuration. The main board 200 and the first sensor 132, the first sensor 132 and the second sensor 172, and the second sensor 172 and the third sensor 192 are connected by different power supply lines and different signal lines. A power supply voltage is applied from the main board 200 to the first sensor 132, the second sensor 172, and the third sensor 192 by the power supply lines. The respective detection results of the first sensor 132, the second sensor 172, and the third sensor 192 are input to the main board 200 by the signal lines. The main board 200, the first sensor 132, the second sensor 172, and the third sensor 192 are connected to a common ground. In at least one embodiment, a configuration in which three sensors are connected in series to the main board 200 is described, but any number of sensors may be connected in series to the main board 200 as long as a plurality of sensors are connected thereto.

The main board 200 controls the conveyance of the sheet 110 based on the detection results of the first sensor 132, the second sensor 172, and the third sensor 192. Therefore, the main board 200 includes a central processing unit (CPU) 201 configured to control the operations of the first sensor 132, the second sensor 172, and the third sensor 192. The main board 200 also includes a power supply switching unit 202 configured to switch a power supply voltage to be applied to each of the first sensor 132, the second sensor 172, and the third sensor 192. The power supply switching unit 202 applies power supply voltages having three different kinds of voltage values to the first sensor 132, the second sensor 172, and the third sensor 192. In at least one embodiment, the power supply switching unit 202 switches the power supply voltages to be applied to the first sensor 132, the second sensor 172, and the third sensor 192 among three kinds of 0 V, 3.3 V, and 5 V. For example, the power supply switching unit 202 sequentially outputs the power supply voltages having the respective voltage values irrespective of a conveyance timing of the sheet 110. The main board 200 includes a pull-up resistor 204 to acquire the detection results of the first sensor 132, the second sensor 172, and the third sensor 192. A predetermined voltage (in this case, 3.3 V) is applied to one end of the pull-up resistor 204, and the other end is connected to the signal line. The main board 200 includes a connector 203 for connection to the first sensor 132 through a power supply line and the signal line.

The first sensor 132 includes a connector 210a, a voltage detector 211a, a power cutoff unit 212a, an LED 213a, a phototransistor 214a, an LED controller 215a, a signal cutoff unit 220a, and a diagnosis unit 221a. The connector 210a is not only connected to the main board 200 through the power supply line and the signal line but also connected to the second sensor 172 provided on the downstream side through another power supply line and another signal line.

The voltage detector 211a detects the power supply voltage applied from the main board 200, and outputs a control signal for performing conduction control of the power cutoff unit 212a and the LED controller 215a based on the voltage value. An operation of the voltage detector 211a is described later in detail.

The power cutoff unit 212a includes a switching element on a supply path for supplying the power supply voltage to the sensor (second sensor 172) in the subsequent stage. The power cutoff unit 212a switches a supply state of the power supply voltage applied from the main board 200 to the second sensor 172 in the subsequent stage when the switching element is switched based on the control signal from the voltage detector 211a. The switching element is, for example, a metal oxide semiconductor (MOS) field effect transistor (FET). When the control signal (voltage value)

from the voltage detector 211a becomes lower than the power supply voltage applied from the main board 200 by a gate threshold voltage (for example, 1 V), the FET is brought into a cutoff state. In this case, the power cutoff unit 212a inhibits the power supply voltage from being supplied to the second sensor 172 in the subsequent stage.

The LED 213a emits light by an electric current flowing based on the power supply voltage applied from the main board 200. The phototransistor 214a receives the light emitted from the LED 213a to operate. In at least one embodiment, the state of the phototransistor 214a is changed to the conductive state when the phototransistor 214a receives the light. A collector terminal of the phototransistor 214a is connected to the pull-up resistor 204 and the CPU 201 of the main board 200 via the signal cutoff unit 220a through the signal line. The LED 213a and the phototransistor 214a form a detector of the first sensor 132.

The signal cutoff unit 220a has a switching element on an output path for outputting a detection result, which extends to the signal line. The signal cutoff unit 220a switches the switching element under the control of the diagnosis unit 221a, to thereby switch a state of connection between the collector terminal of the phototransistor 214a and each of the pull-up resistor 204 and the CPU 201. The switching element is, for example, a MOS FET.

The diagnosis unit 221a performs a failure diagnosis in the first sensor 132. The diagnosis unit 221a controls the signal cutoff unit 220a to a cutoff state when the first sensor 132 has failed. That is, when the first sensor 132 has failed, the first sensor 132 is cut off from the signal line. The diagnosis unit 221a detects a failure in each of the LED controller 215a, the LED 213a, and the phototransistor 214a. The operation of the diagnosis unit 221a is described later in detail.

In a case where the phototransistor 214a and the signal cutoff unit 220a are in the conductive state, a ground voltage (0 V) is input to the CPU 201 as the detection result of the first sensor 132. In a case where the phototransistor 214a and the signal cutoff unit 220a are in the cutoff state, the voltage (3.3 V) to be applied to the pull-up resistor 204 is input to the CPU 201 as the detection result of the first sensor 132. The phototransistor 214a itself is in a high impedance state when being in the cutoff state. In this manner, the CPU 201 can detect the conductive state or the cutoff state (open state) of the phototransistor 214a and the signal cutoff unit 220a. The phototransistor 214a is brought into the cutoff state when, for example, the light emitted from the LED 213a is blocked by the sheet 110. The CPU 201 can detect the sheet 110 by detecting the cutoff state.

The LED controller 215a includes a switching element on the path for applying the power supply voltage to the LED 213a. The LED controller 215a switches an application state of the power supply voltage applied from the main board 200 to the LED 213a by switching the switch element based on a control signal from the voltage detector 211a. The switching element is, for example, a MOS FET. When the voltage of the control signal from the voltage detector 211a becomes lower than the power supply voltage applied from the main board 200 by the gate threshold voltage (for example, 1 V), the FET is brought into a cutoff state, and the LED controller 215a does not apply the power supply voltage to the LED 213a. In a case where the power supply voltage is not applied to the LED 213a, an electric current does not flow therethrough, with the result that the LED 213a does not emit light.

Now, the operation of the voltage detector 211a is described. The voltage detector 211a detects falling of the power supply voltage applied from the main board 200 with, for example, a threshold value of 4 V. The voltage detector 211a is in a "first state" in an initial state at power-on, and maintains the first state until the falling of the applied power supply voltage across 4 V is detected after the applied power supply voltage temporarily becomes equal to or higher than 4 V (for example, 5 V). The voltage detector 211a detects the falling across 4 V when the applied power supply voltage decreases from 5 V to 3.3 V. In this case, the voltage detector 211a is brought into a "second state". The voltage detector 211a that has been brought into the second state maintains the second state until the power supply voltage applied from the main board 200 becomes 0 V irrespective of changes in power supply voltage. The state in which the power supply voltage applied from the main board 200 becomes 0 V is referred to as "initialization".

While being in the initial state (first state) at power-on, the voltage detector 211a controls the power cutoff unit 212a to be in a cutoff state in which the power supply voltage is not supplied to the second sensor 172 on the downstream side. While being in the second state, the voltage detector 211a controls the power cutoff unit 212a to be in a conductive state in which the power supply voltage is supplied to the second sensor 172 on the downstream side. The voltage detector 211a controls the power cutoff unit 212a to be in a conductive state in response to the falling of the power supply voltage from 5 V to 3.3 V. The voltage detector 211a maintains the power cutoff unit 212a in the conductive state until the power supply voltage reaches 0 V. While being in the first state, the voltage detector 211a controls the LED controller 215a to be in a conductive state in which an electric current is supplied to the LED 213a to cause the LED 213a to emit light. In the conductive state, the LED 213a emits light based on the power supply voltage. While being in the second state, the voltage detector 211a controls the LED controller 215a to be in a cutoff state in which the electric current supplied to the LED 213a is cut off to cause the LED 213a to turn out the light. The voltage detector 211a controls the LED controller 215a to cause the LED 213a to turn out the light in response to the falling of the power supply voltage from 5 V to 3.3 V. Even when the power supply voltage rises from 3.3 V to 5 V, the LED controller 215a maintains the cutoff state. Therefore, the LED 213a keeps the light turned out.

In any one of the first state and the second state, the voltage detector 211a can control the states of the power cutoff unit 212a and the LED controller 215a based on a diagnosis result obtained by the diagnosis unit 221a. In a case where the diagnosis unit 221a detects a failure in the first sensor 132, the voltage detector 211a brings the power cutoff unit 212a into a conductive state, brings the LED controller 215a into a cutoff state, and fixes those states.

The operation of the diagnosis unit 221a is described. The diagnosis unit 221a can switch the state of the LED controller 215a between the conductive state and the cutoff state. The LED controller 215a can detect the amount of a current supplied to the LED 213a. The diagnosis unit 221a compares a current value detected by the LED controller 215a with a predetermined value, and performs the failure diagnosis of each of the LED controller 215a and the LED 213a based on a result of the comparison.

The diagnosis unit 221a also performs the failure diagnosis of the light receiver including the phototransistor 214a. The diagnosis unit 221a switches the state of the LED controller 215a between the conductive state and the cutoff state under a state in which, for example, the phototransistor 214a cannot receive light, and detects a voltage at a point A, to thereby perform the failure diagnosis of the phototransistor 214a. At the point A, the voltage value changes depending on the light receiving state of the phototransistor 214a. Therefore, the diagnosis unit 221a performs the failure diagnosis of the phototransistor 214a by detecting the light receiving state of the phototransistor 214a. The state in which the phototransistor 214a cannot receive light is achieved by a user or a service person using, for example, a sheet for inspection to block light from the LED 213a in accordance with an instruction from an operation unit screen (not shown). In another case, the state in which the phototransistor 214a cannot receive light may be achieved by operating a light-shielding member so as to block light from the LED 213a in accordance with an instruction from the operation unit screen.

The second sensor 172 includes a connector 210b, a voltage detector 211b, a power cutoff unit 212b, an LED 213b, a phototransistor 214b, an LED controller 215b, a signal cutoff unit 220b, and a diagnosis unit 221b. The connector 210b is not only connected to the first sensor 132 on the upstream side through the power supply line and the signal line but also connected to the third sensor 192 provided on the downstream side through another power supply line and another signal line. The configurations and operations of the respective units of the second sensor 172 are the same as the configurations and operations of the respective corresponding units of the first sensor 132, and hence descriptions thereof are omitted. The collector terminal of the phototransistor 214b of the second sensor 172 is connected to the output path of the first sensor 132. Therefore, the detection result of the second sensor 172 is transmitted to the main board 200 through the first sensor 132.

The third sensor 192 includes a connector 210c, a voltage detector 211c, a power cutoff unit 212c, an LED 213c, a phototransistor 214c, an LED controller 215c, a signal cutoff unit 220c, and a diagnosis unit 221c. The connector 210c is connected to the second sensor 172 on the upstream side through the power supply line and the signal line. The third sensor 192 is arranged on the most downstream side of the series connection, and hence the connector 210c is not connected to any component in the subsequent stage. The configurations and operations of the respective units of the third sensor 192 are the same as the configurations and operations of the respective corresponding units of the first sensor 132, and hence descriptions thereof are omitted. The collector terminal of the phototransistor 214c of the third sensor 192 is connected to the output path of the first sensor 132 through the second sensor 172. Therefore, the detection result of the third sensor 192 is transmitted to the main board 200 through the second sensor 172 and the first sensor 132.

With such a connection, transmission lines for connecting the main board 200 to the first sensor 132, the second sensor 172, and the third sensor 192 is simplified. This can prevent the transmission lines from increasing in number and being complicated in a case where the second sensor 172 and the third sensor 192 are directly connected to the main board 200. It is also possible for the main board 200 to reduce the number of pins of the connector 203 to which the transmission lines are connected, and to suppress the occupied area of the connector 203. Therefore, it is possible to suppress an increase in cost of the main board 200.

Processing

Figure 3:
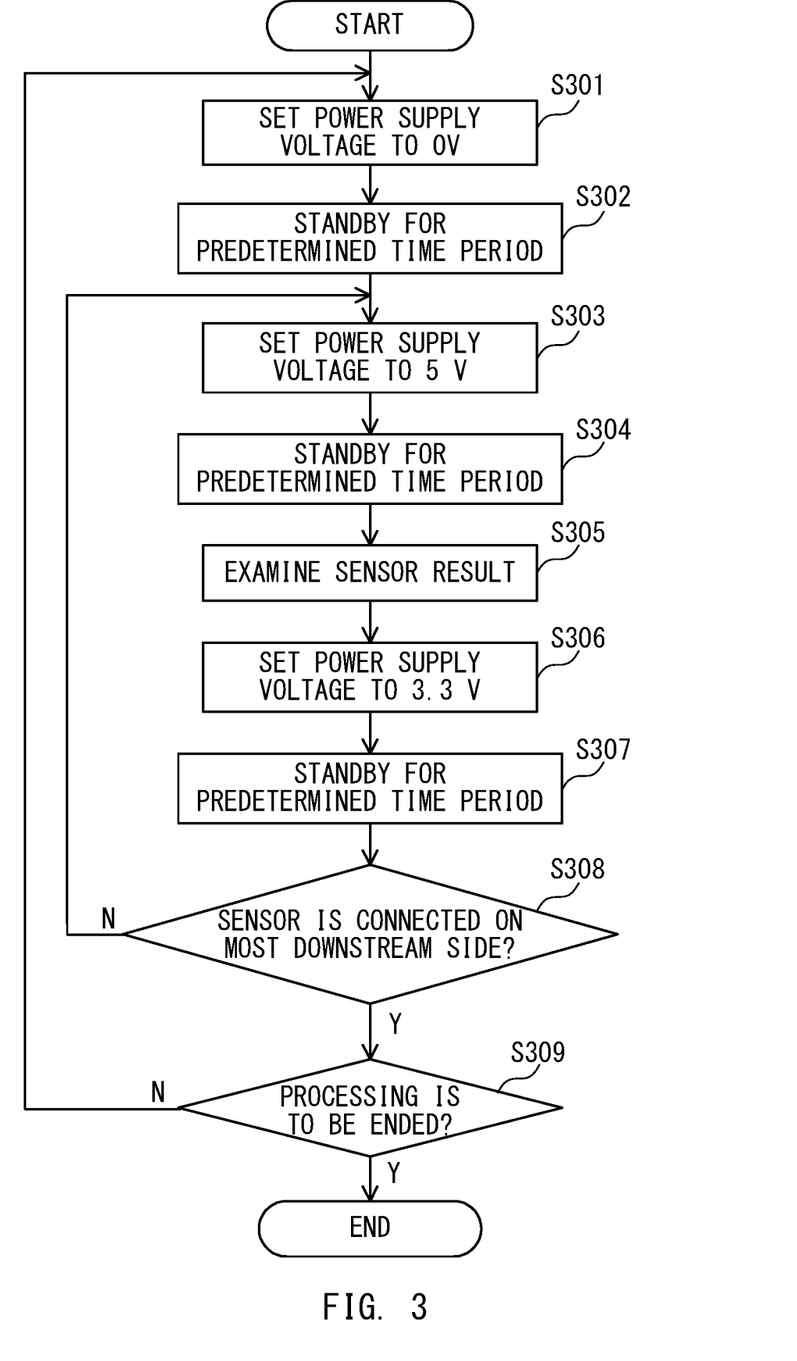
FIG. 3 is a flow chart for illustrating operation control processing for a sensor, which is performed in a case where a failure diagnosis is not performed.
Figure 4:
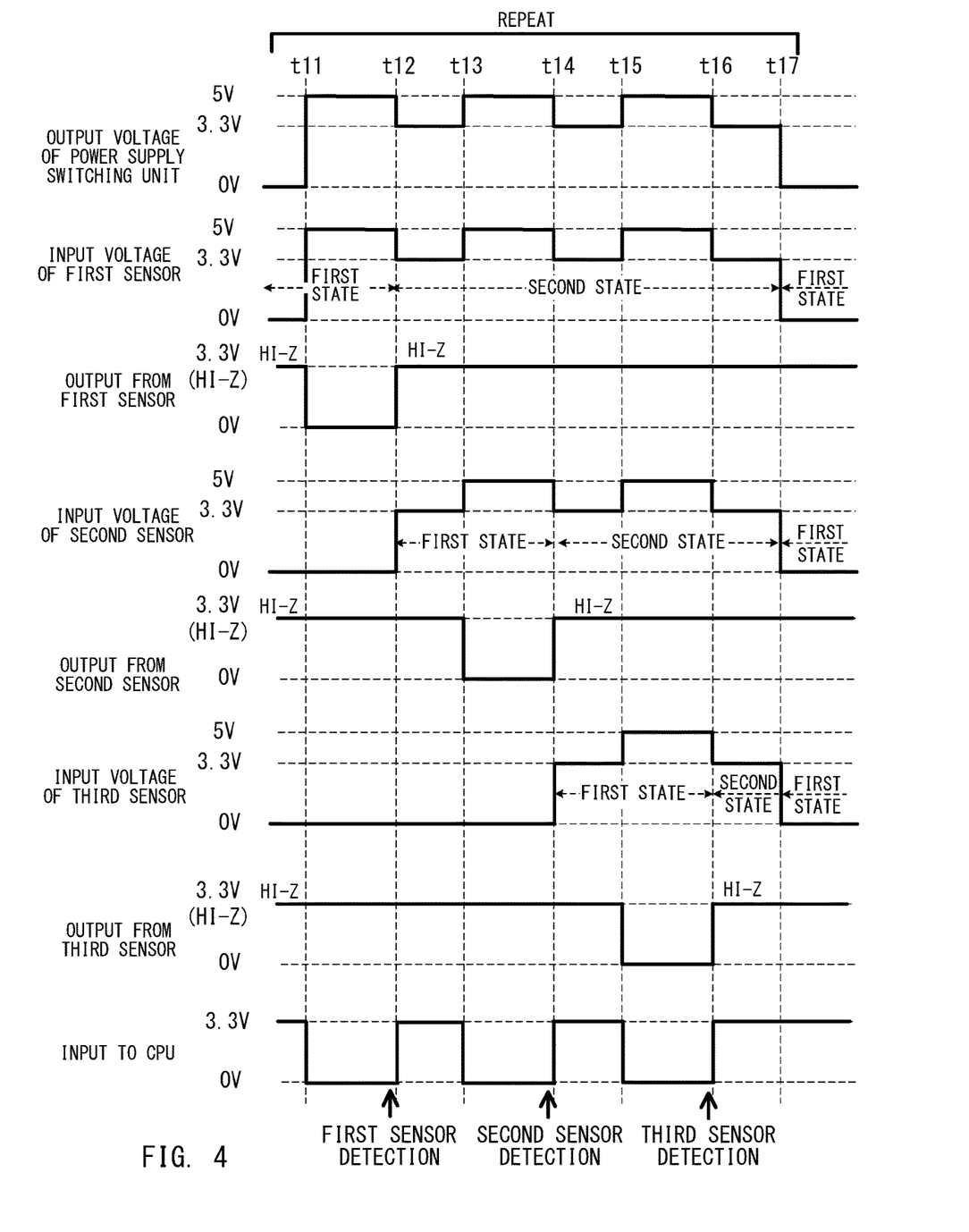
FIG. 4 is a timing chart exhibited in a case where operations are controlled.

FIG. 3 is a flow chart for illustrating operation control processing for controlling a detection operation of a sensor, which is performed when a failure diagnosis is not performed. FIG. 4 is a timing chart exhibited when the operation control is performed. The CPU 201 starts the operation control processing, for example, before the sheet 110 is conveyed. The CPU 201 repeatedly executes the detection operation while the sheet 110 is being conveyed along the conveyance path of the image forming apparatus 100. Then, the sheet 110 is delivered from the image forming apparatus 100. After that, the CPU 201 brings the operation control processing to an end. When the image forming apparatus 100 continuously forms an image on a plurality of sheets 110, the CPU 201 starts the operation control processing before the first sheet among the plurality of sheets 110 is conveyed, and after all the plurality of sheets 110 are delivered, brings the operation control processing to an end.

When the CPU 201 has started the operation control processing, the CPU 201 first sets the power supply voltage output by the power supply switching unit 202 to 0 V (Step S301). The CPU 201 stands by for a predetermined time period (in at least one embodiment, 100 microseconds) while maintaining the power supply voltage at 0 V (Step S302). The predetermined time period is set as a time period long enough to control the power cutoff units 212a, 212b, and 212c to a cutoff state (state in which the power supply voltage is not supplied to the second sensor 172 and the third sensor 192) being an initial state.

When the predetermined time period has elapsed since the power supply voltage was set to 0 V, the CPU 201 sets the power supply voltage output by the power supply switching unit 202 to 5 V (Step S303). At this time, the voltage detector 211a is in the first state, and the LED controller 215a causes the LED 213a to emit light. The power cutoff unit 212a is in the cutoff state, and hence the power supply voltage is not supplied to the second sensor 172 and the third sensor 192. The CPU 201 stands by for a predetermined time period (in at least one embodiment, 100 microseconds) while maintaining the power supply voltage at 5 V (Step S304). The predetermined time period is set as a time period longer than a time period to be taken after the power supply voltage is applied to the first sensor 132 until the detection result obtained from the first sensor 132 is input to the CPU 201 without fail.

After the predetermined time period has elapsed with the power supply voltage being at 5 V, the CPU 201 acquires the voltage value of the signal line to examine the detection result of the first sensor 132 (Step S305). With the processing of Step S305, the CPU 201 detects based on the voltage value whether the phototransistor 214a of the first sensor 132 is in the conductive state in which light is received or the cutoff state in which light is not received. The phototransistor 214b of the second sensor 172 and the phototransistor 214c of the third sensor 192 can be also connected to the output path and signal line for connecting the phototransistor 214a and the CPU 201. However, the power cutoff unit 212a of the first sensor 132 is in the cutoff state, and hence the power supply voltage is not supplied to the second sensor 172 and the third sensor 192. With this arrangement, while the CPU 201 is acquiring the detection result obtained by the phototransistor 214a, the output value (voltage value) of the signal line changes based only on the detection result obtained by the phototransistor 214a.

In a case where the output value of the signal line is 0 V, the CPU 201 determines that the phototransistor 214a of the first sensor 132 is in the conductive state. That is, in a case where the output value of the signal line is 0 V, the first sensor 132 has not detected the sheet 110. Meanwhile, in a case where the output value of the signal line is 3.3 V, the CPU 201 determines that the phototransistor 214a of the first sensor 132 is in the cutoff state. That is, in a case where the output value of the signal line is 3.3 V, the first sensor 132 has detected the sheet 110. In this manner, the CPU 201 acquires the output value of the signal line in the processing of Step S305, to thereby be able to determine the detection state of the sensor.

The processing from Step S303 to Step S305 is processing performed between a time t11 and a time t12 of FIG. 4. In the example of FIG. 4, waveforms exhibited when the light emitted from the LED 213a is received by the phototransistor 214a are illustrated. No shielding object exists between the LED 213a and the phototransistor 214a, and hence the phototransistor 214a is brought into the conductive state, and the output value of 0 V is detected. When a shielding object exists between the LED 213a and the phototransistor 214a, the phototransistor 214a is brought into the cutoff state, and the output value of 3.3 V is detected.

The CPU 201, which has examined the detection result, controls the power supply switching unit 202 to switch the power supply voltage from 5 V to 3.3 V (Step S306). At this time, the voltage detector 211a detects the falling of the power supply voltage, and is therefore changed from the first state to the second state. The voltage detector 211a subsequently maintains the second state until the power supply voltage reaches 0 V. In a case where the voltage detector 211a is brought into the second state, the power cutoff unit 212a is brought into the conductive state, and is controlled to allow the power supply voltage to be supplied to the second sensor 172 provided on the downstream side. The LED controller 215a of the first sensor 132 is brought into the cutoff state to cut off the current supply to the LED 213a. Therefore, the LED 213a of the first sensor 132 turns out the light. In short, the phototransistor 214a is brought into the cutoff state.

The CPU 201 stands by for a predetermined time period (in at least one embodiment, 75 microseconds) while maintaining the power supply voltage at 3.3 V (Step S307). It suffices that the predetermined time period is a time period required for changing the state of the voltage detector 211a of the first sensor 132 to the second state and bringing the LED controller 215b of the second sensor 172 into the conductive state to cause the LED 213b to emit light. In a case where the power cutoff unit 212a of the first sensor 132 is brought into the conductive state, the power supply voltage can be supplied to the second sensor 172. When the supply of the power supply voltage is started, the voltage detector 211b of the second sensor 172 is controlled to the first state being the initial state. The power cutoff unit 212b of the second sensor 172 is controlled to the cutoff state. The LED controller 215b of the second sensor 172 is brought into the conductive state. The LED 213b emits light by the electric current supplied thereto.

After the predetermined time period has elapsed with the power supply voltage being maintained at 3.3 V, the CPU 201 determines whether or not the sensor from which the detection result was acquired in the processing of Step S305 is connected on the most downstream side of the series connection (Step S308). The processing from Step S305 to Step S308 is processing performed between the time t12 and a time t13 of FIG. 4. For example, the configurations (including number) of sensors connected in series are registered in the CPU 201 in advance, and the CPU 201 determines based on the configurations and the number of the acquired detection results whether or not the sensor from which the detection result has been acquired is connected on the most downstream side. In a case where the number of the acquired detection results is smaller than a number determined in advance, the CPU 201 determines that the sensor from which the detection result has been acquired is not the sensor connected on the most downstream side. In addition, when the number of times that, for example, the power supply voltage is dropped from 5 V to 3.3 V reaches a predetermined number, the CPU 201 determines that the sensor is connected on the most downstream side. The predetermined number is determined in advance based on the number of sensors connected in series. When the number of times that the power supply voltage is dropped from 5 V to 3.3 V is smaller than the predetermined number, the CPU 201 determines that the sensor from which the detection result has been acquired is not the sensor connected on the most downstream side.

At this time, the detection result of the first sensor 132 has been acquired (N in Step S308), and hence the CPU 201 again performs the processing from Step S303 to Step S308. With this processing, the CPU 201 acquires the detection result of the second sensor 172. In the processing of Step S305, the phototransistor 214a of the first sensor 132 and the phototransistor 214c of the third sensor 192 are controlled to a non-operation state. Therefore, the output value of the signal line changes based only on the detection result obtained by the phototransistor 214b of the second sensor 172. The processing from Step S303 to Step S305 is processing performed between the time t13 and a time t14 of FIG. 4.

After acquiring the detection result of the second sensor 172, the CPU 201 determines whether or not the detection result has been acquired from the sensor connected on the most downstream side of the series connection (Step S308). At this time, the detection result has been acquired from the second sensor 172 (N in Step S308), and hence the CPU 201 again performs the processing from Step S303 to Step S308. In the processing of Step S305, the phototransistor 214a of the first sensor 132 and the phototransistor 214b of the second sensor 172 are controlled to a non-operation state. Therefore, the output value of the signal line changes based only on the detection result obtained by the phototransistor 214c of the third sensor 192. With this processing, the CPU 201 acquires the detection result of the third sensor 192. The processing from Step S303 to Step S308 is processing performed between a time t15 and a time t16 of FIG. 4.

The third sensor 192 is a sensor connected on the most downstream side. Therefore, the CPU 201 determines that the detection result has been acquired from the sensor connected on the most downstream side of the series connection (Y in Step S308). That is, the number of the acquired detection results is the same as the number determined in advance, and hence the CPU 201 determines that the detection result has been acquired from the sensor connected on the most downstream side. When the sheet 110 is being conveyed, the detection operation is continued. When the detection operation is to be continued (N in Step S309), the CPU 201 returns to the processing of Step S301 to set the power supply voltage output by the power supply switching unit 202 to 0 V, and stands by for a predetermined time period. In Step S301, the power supply voltage of 0 V corresponds to a reset signal for activating a sensor (first sensor 132) connected on the most upstream side as a sensor for acquiring the detection result. The CPU 201 controls the power supply voltage to 0 V after the detection result of the third sensor 192 is acquired, to thereby be able to acquire the detection result obtained from the first sensor 132 among the plurality of sensors. When the power supply voltage is controlled to 0 V, the respective states of the voltage detectors 211a, 211b, and 211c of the first sensor 132 to the third sensor 192, which are connected in series, are initialized to be brought into the first state. The power cutoff units 212a, 212b, and 212c are brought into the cutoff state being the initial state, to thereby cut off the power supply voltage supplied to the sensor connected on the downstream side. The CPU 201 repeatedly performs the processing from Step S303 to Step S309, to thereby be able to repeatedly detect the states of the first sensor 132 to the third sensor 192. In this manner, the first sensor 132 to the third sensor 192 sequentially perform detection operations. When the detection operation is to be brought to an end (Y in Step S309), the CPU 201 brings the processing to an end.

The CPU 201 acquires the detection result of the sensor at a timing before changing the power supply voltage from 5 V to 3.3 V. Therefore, the CPU 201 can stably acquire the detection result. For example, when a print job for continuously forming an image on the plurality of sheets 110 is executed, the CPU 201 brings the detection operation to an end after all sheets conveyed along the conveyance path during the print job are delivered from the image forming apparatus 100. The CPU 201 repeatedly acquires the detection results of the first sensor 132 to the third sensor 192. Then, the image forming apparatus 100 controls the conveyance of the sheet 110 based on the detection results of the first sensor 132, the second sensor 172, and the third sensor 192.

With the above-mentioned processing, the first sensor 132 to the third sensor 192 perform the same operation on the input signal (power supply voltage). However, through shifting of the timing to supply power to the respective sensors, the CPU 201 can independently detect the states of all the sensors. The main board 200 alternately applies two kinds of power supply voltages (5 V and 3.3 V) to a plurality of sensors, to thereby cause the respective sensors to sequentially perform the detection operations. The main board 200 applies another power supply voltage (0 V), to thereby cause the sensors to again perform the detection operations sequentially from the first stage.

Each sensor can also use the same interface for connection to the main board 200 or another sensor irrespective of the connection point (most upstream, most downstream, or halfway) in the series connection. Therefore, sensors of the same kind can be used as all the sensors, and hence it is not required to manage the correspondence between the connection point and the sensor and to change outer shapes of the individual sensors. The number of sensors connected in series is three in at least one embodiment, but it is also possible to further increase the number of sensors under the same control.

Figure 5:
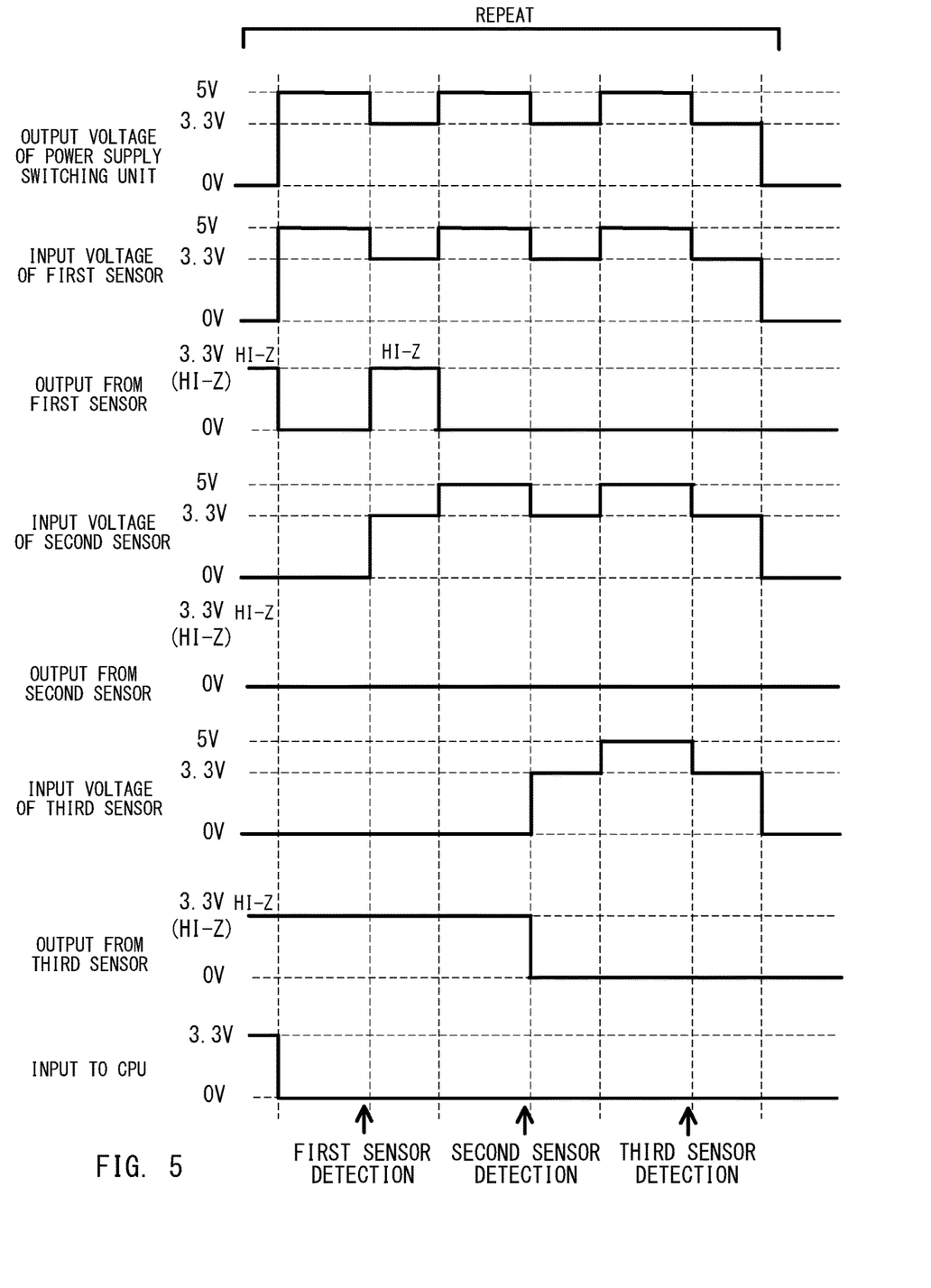
FIG. 5 is a timing chart exhibited in a case where the operation control processing is performed in a case where an abnormality has occurred in a sensor.

A description is given of a case in which an abnormality has occurred in any one of the first sensor 132, the second sensor 172, and the third sensor 192 during the above-mentioned normal operation. FIG. 5 is an example of a timing chart exhibited when the operation control processing is performed in a case where an abnormality has occurred in a sensor.

For example, when the phototransistor 214b of the second sensor 172 fails in a short-circuit mode, the output value of the phototransistor 214b is fixed to a ground voltage (0 V). Under a state in which the power supply voltage is being applied to the third sensor 192, when the signal cutoff unit 220b is not provided, the phototransistor 214b of the second sensor 172 is connected to the phototransistor 214c of the third sensor 192. Therefore, when the signal cutoff unit 220b is not provided, the output value of the phototransistor 214c is fixed to the ground voltage. In this manner, in the event that the second sensor 172 fails in the short-circuit mode, the CPU 201 becomes unable to normally acquire the detection result of the third sensor 192 even when the third sensor 192 is operating normally.

Figure 6:
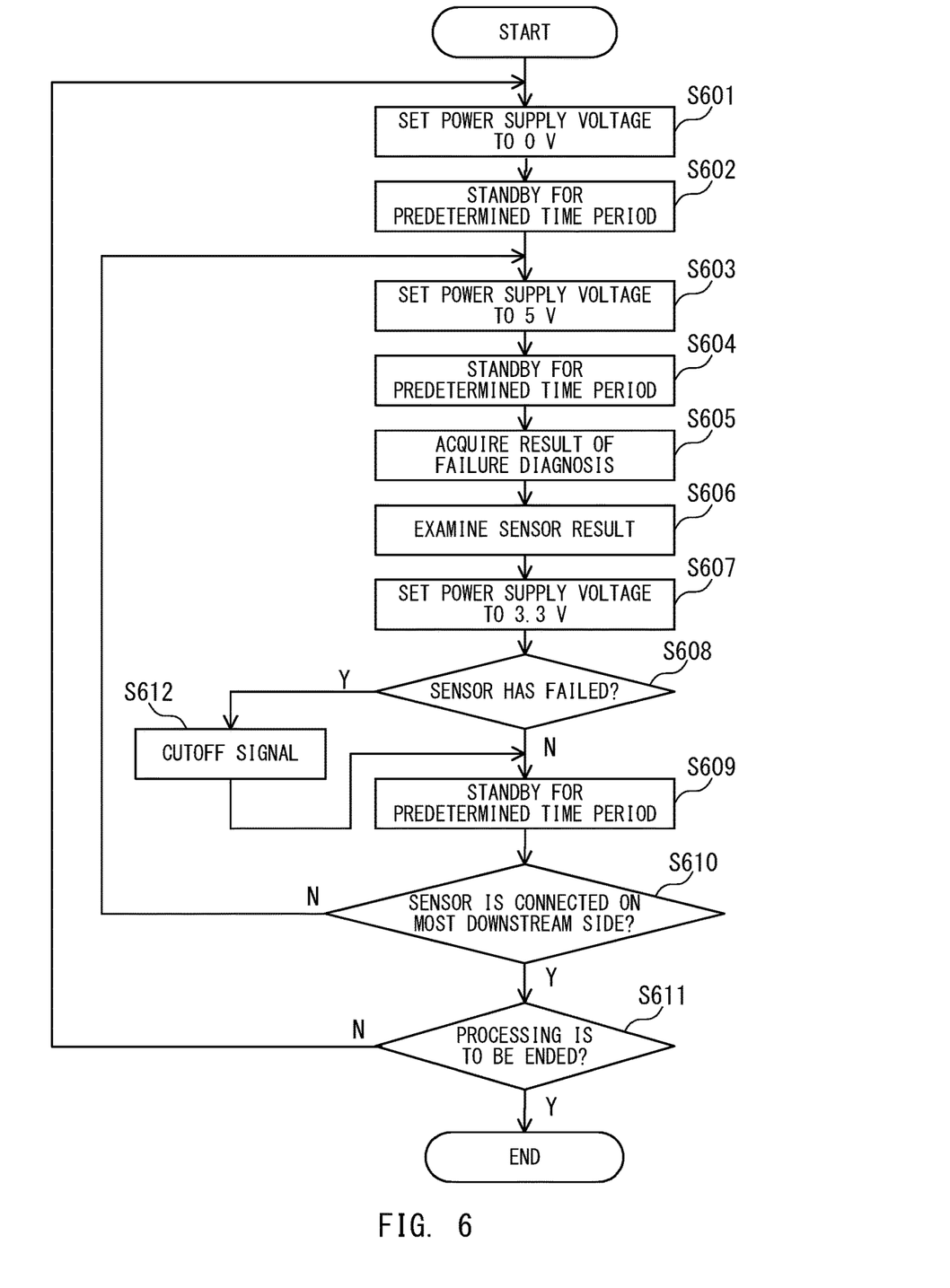
FIG. 6 is a flow chart for illustrating operation control processing for a sensor, which is performed in a case where a failure diagnosis is performed.
Figure 7:
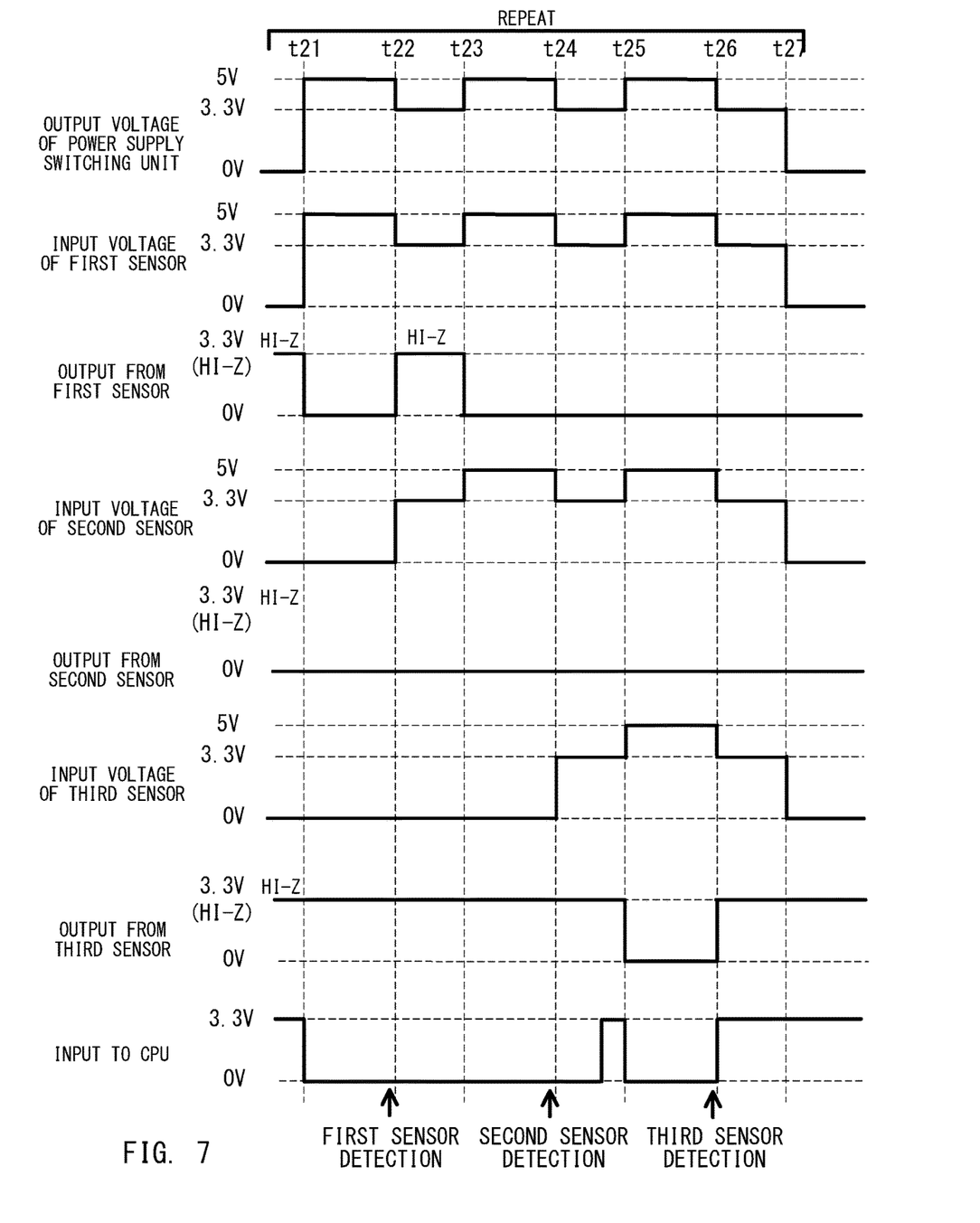
FIG. 7 is a timing chart exhibited in a case where operations are controlled.

FIG. 6 is a flow chart for illustrating operation control processing for controlling the detection operation of a sensor, which is performed when a failure diagnosis is performed. FIG. 7 is a timing chart exhibited when the operation control processing is performed. In this processing, the failure diagnosis is constantly performed along with the operation control processing.

The CPU 201 stands by for a predetermined time period (in at least one embodiment, 100 microseconds) while maintaining the power supply voltage at 5 V in the same processing as the processing from Step S301 to Step S304 of FIG. 3 (Step S601 to Step S604). After the predetermined time period has elapsed with the power supply voltage being maintained at 5 V, the CPU 201 acquires the result of the failure diagnosis from the first sensor 132 (Step S605). The CPU 201 determines whether or not the first sensor 132 is normally operating based on the acquired result of the failure diagnosis.

After determining whether or not the first sensor 132 is normally operating, in the same processing as the processing of Step S305 and Step S306 of FIG. 3, the CPU 201 acquires the voltage value of the signal line, and examines the detection result of the first sensor 132 to set the power supply voltage to 3.3 V (Step S606 and Step S607). After the power supply voltage is switched, the failure diagnosis result for the first sensor 132 is normal in the example of FIG. 5, and hence the CPU 201 stands by for a predetermined time period in the same manner as in the processing of Step S307 (N in Step S608, and Step S609).

The first sensor 132 is not the sensor on the most downstream side, and hence the CPU 201 repeatedly performs Step S603 and the subsequent processing (N in Step S610). In the example of FIG. 5, the second sensor 172 has failed in the short-circuit mode. Therefore, the CPU 201 determines that the second sensor 172 does not normally operate based on the failure diagnosis result acquired in the processing of Step S605. The CPU 201 examines the detection result of the second sensor 172 to set the power supply voltage to 3.3 V (Step S606 and Step S607). The CPU 201 acquires 0 V as the detection result of the second sensor 172 due to the failure in the second sensor 172. The second sensor 172 has failed (Y in Step S608), and hence the second sensor 172 brings the power cutoff unit 212b into the conductive state, and brings the signal cutoff unit 220b into the cutoff state (Step S612). The detection result of the second sensor 172 becomes 0 V due to the influence of the failure in the phototransistor 214b in the short-circuit mode, and hence the second sensor 172 brings the signal cutoff unit 220b into the cutoff state.

The second sensor 172 is not the sensor on the most downstream side, and hence the CPU 201 repeatedly performs Step S603 and the subsequent processing (N in Step S610). This allows the CPU 201 to acquire the detection result of the third sensor 192. The phototransistor 214b of the second sensor 172 has failed in the short-circuit mode, but the output path of the second sensor 172 is cut off by the signal cutoff unit 220b. Therefore, the CPU 201 can acquire the detection result of the third sensor 192. The CPU 201 that has acquired the detection result of the third sensor 192 sequentially acquires the detection results again from the first sensor 132 in the same processing as the processing of Step S308 and Step S309 of FIG. 3, or brings the processing to an end (Step S610 and Step S611).

With the above-mentioned processing, when a failed sensor is connected, it is possible to exclude the sensor from a sensor system formed of a plurality of sensors connected in series, and to allow a normally operating sensor to continue to perform a detection operation. In the example of FIG. 7, even when the second sensor 172 fails, the third sensor 192 can normally operate. Therefore, in the event of a failure in the second sensor 172, the image forming apparatus 100 illustrated in FIG. 1 cannot feed a sheet from the sheet feeding cassette 160, but the first sensor 132 and the third sensor 192 can normally operate. Therefore, the image forming apparatus 100 can perform printing by feeding a sheet from each of the sheet feeding cassette 120 and the sheet feeding cassette 180.

In this manner, the sensor control apparatus of at least one embodiment, in which a plurality of sensors and a control board are connected in series, allows each of the sensors to diagnose its own operation. In the event of a failure, the failed sensor is electrically isolated. Therefore, even when any one of the sensors fails, the sensor control apparatus can suppress an influence to be exerted on another sensor.

According to at least one embodiment of the present disclosure, it is possible to suppress an influence to be exerted on another sensor by electrically isolating a failed sensor from the entire configuration.

The present disclosure is not limited to the embodiments described above, and various changes and modifications can be made without departing from the spirit and scope of the present disclosure. The following claims are appended hereto in order to make the scope of the present disclosure public.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A sensor control apparatus comprising:
  a controller; and
  a plurality of sensors connected in series to the controller, the plurality of sensors each including:
    a detector configured to perform a detection operation based on a first voltage applied from the controller;
    a first switch provided on a first path for applying a voltage, which extends from the controller to the detector;
    a second switch provided on a second path for supplying the voltage applied from the controller to one of the plurality of sensors in a subsequent stage;
    a third switch provided on a third path for outputting a detection result obtained by the detector, which extends to the controller; and
    a diagnosis unit configured to perform a failure diagnosis of the detector,
  wherein the diagnosis unit is configured to bring, in a case where it is diagnosed that a failure has occurred in the detector, the third switch into a cutoff state, to thereby electrically isolate the sensor from the series connection.

2. The sensor control apparatus according to claim 1, further comprising a conduction controller configured to:
  bring the first switch into a conductive state and bring the second switch into a cutoff state in a case where the voltage on the first path is the first voltage;
  bring the first switch into a cutoff state and bring the second switch into a conductive state in a case where the voltage on the first path is a second voltage, which is different from the first voltage; and
  maintain, in a case where the first switch is brought into the cutoff state and the second switch is brought into the conductive state, the cutoff state and the conductive state until a third voltage, which is different from the first voltage and the second voltage, is applied to the first path,
wherein, in a case where the diagnosis unit diagnoses that a failure has occurred in the detector, the conduction controller fixes the first switch to the cutoff state, and fixes the second switch to the conductive state.

3. The sensor control apparatus according to claim 2, wherein the controller is configured to cause the plurality of sensors to sequentially perform the detection operations by alternately applying the first voltage and the second voltage.

4. The sensor control apparatus according to claim 3, wherein, in a case where all the plurality of sensors have performed the detection operations, the controller applies the third voltage to cause the plurality of sensors to sequentially perform the detection operations again from one of the plurality of sensors in a first stage.

5. The sensor control apparatus according to claim 1, wherein the diagnosis unit is configured to perform the failure diagnosis of the first switch, and in a case where it is determined that a failure has occurred in the first switch, bring the first switch into a cutoff state.

6. The sensor control apparatus according to claim 1,
  wherein the first switch is configured to detect an amount of a current supplied to the detector, and
  wherein the diagnosis unit is configured to perform the failure diagnosis of each of the first switch and the detector based on the amount of the current supplied to the detector.

7. The sensor control apparatus according to claim 1,
  wherein the detector includes:
    a light emitter; and
    a light receiver configured to receive light emitted from the light emitter, and
  wherein the diagnosis unit is configured to perform the failure diagnosis of the detector by, under a state in which the light receiver is unable to receive light, bringing the first switch into a conductive state and detecting a light receiving state of the light receiver.

8. A sensor system comprising a plurality of sensors connected in series to a controller,
  the sensor system being configured to have an operation thereof controlled by the controller,
  the plurality of sensors each including:
    a detector configured to perform a detection operation based on a first voltage applied from the controller;
    a first switch provided on a first path for applying a voltage, which extends from the controller to the detector;
    a second switch provided on a second path for supplying the voltage applied from the controller to one of the plurality of sensors in a subsequent stage;
    a third switch provided on a third path for outputting a detection result obtained by the detector, which extends to the controller; and
    a diagnosis unit configured to perform a failure diagnosis of the detector, and the diagnosis unit being configured to bring, in a case where it is diagnosed that a failure has occurred in the detector, the third switch into a cutoff state, to thereby electrically isolate the sensor from the series connection.

9. An image forming apparatus comprising:
a sensor control apparatus;
a plurality of containers each configured to receive a sheet;
an image forming unit configured to form an image on the sheet; and
a conveyor configured to convey the sheet from each of the plurality of containers to the image forming unit through a conveyance path,
  the sensor control apparatus including:
    a controller; and
    a plurality of sensors connected in series to the controller,
  the plurality of sensors each including:
    a detector configured to perform a detection operation based on a first voltage applied from the controller;
    a first switch provided on a first path for applying a voltage, which extends from the controller to the detector;
    a second switch provided on a second path for supplying the voltage applied from the controller to one of the plurality of sensors in a subsequent stage;
    a third switch provided on a third path for outputting a detection result obtained by the detector, which extends to the controller; and
    a diagnosis unit configured to perform a failure diagnosis of the detector,
  the plurality of sensors each being provided between each of the plurality of containers and the conveyance path, and each being configured to detect the sheet, and
  the diagnosis unit being configured to bring, in a case where it is diagnosed that a failure has occurred in the detector, the third switch into a cutoff state, to thereby electrically isolate the sensor from the series connection.

10. The image forming apparatus according to claim 9, wherein the controller is configured to apply the first voltage, a second voltage, and a third voltage irrespective of a conveyance timing of the sheet.

* * * * *